(12) United States Patent
Arunapuram

(10) Patent No.: US 9,990,602 B2
(45) Date of Patent: Jun. 5, 2018

(54) COST AND LATENCY REDUCTIONS THROUGH DYNAMIC UPDATES OF ORDER MOVEMENT THROUGH A TRANSPORTATION NETWORK

(71) Applicant: Oracle International Corporation, Redwood Shores, CA (US)

(72) Inventor: Sundararajan Arunapuram, West Chester, PA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 954 days.

(21) Appl. No.: 14/107,761

(22) Filed: Dec. 16, 2013

(65) Prior Publication Data

US 2014/0180957 A1    Jun. 26, 2014

Related U.S. Application Data

(60) Provisional application No. 61/740,443, filed on Dec. 20, 2012, provisional application No. 61/785,583, filed on Mar. 14, 2013.

(51) Int. Cl.
    *G06Q 40/00* (2012.01)
    *G06Q 10/08* (2012.01)
    (Continued)

(52) U.S. Cl.
    CPC ..... *G06Q 10/08355* (2013.01); *G06Q 10/047* (2013.01); *G06Q 50/28* (2013.01)

(58) Field of Classification Search
    CPC .................................................. G06Q 40/00
    (Continued)

(56) References Cited

U.S. PATENT DOCUMENTS

| 7,278,568 B2 | 10/2007 | Kadaba |
| 8,275,676 B2 | 9/2012 | Roberts et al. |

(Continued)

FOREIGN PATENT DOCUMENTS

| EP | 1086754 A2 | 3/2001 |
| EP | 1909221 A1 | 4/2008 |

(Continued)

OTHER PUBLICATIONS

Non-final Office Action dated Jun. 17, 2016 for related U.S. Appl. No. 14/107,865.

(Continued)

*Primary Examiner* — Kirsten Apple
(74) *Attorney, Agent, or Firm* — Vita IP Law Group, LLP

(57) ABSTRACT

A method, system, and computer program product for shipping management. The computer implemented method commences upon receiving a first set of orders to be shipped to a destination region in accordance with a first set of timing constraints, then building a first set of multi-stop shipments, the first set of multi-stop shipments comprising a first multi-stop carrier schedule that satisfies the set of timing constraints. The method waits a calculated duration before receiving a second set of orders to be shipped to the destination region in accordance with a second set of timing constraints. A second set of multi-stop shipments is built, wherein the second set of multi-stop shipments comprises a second multi-stop carrier schedule for at least one stop not included in the first set of multi-stop shipments, and the second multi-stop carrier schedule satisfies both the first set of timing constraints and the second set of timing constraints.

20 Claims, 10 Drawing Sheets

(51) Int. Cl.
*G06Q 50/28* (2012.01)
*G06Q 10/04* (2012.01)

(58) Field of Classification Search
USPC .................................................. 705/35, 36 R
See application file for complete search history.

(56) References Cited

U.S. PATENT DOCUMENTS

| | | | |
|---|---|---|---|
| 8,386,397 | B1 | 2/2013 | Agarwal et al. |
| 8,554,702 | B2 | 10/2013 | Arunapuram |
| 2002/0019759 | A1 | 2/2002 | Arunapuram et al. |
| 2002/0049622 | A1* | 4/2002 | Lettich .................. G06Q 10/063 705/7.11 |
| 2002/0065738 | A1* | 5/2002 | Riggs .................. G06Q 10/0631 705/334 |
| 2002/0069210 | A1* | 6/2002 | Navani .................... G06Q 10/06 |
| 2002/0082893 | A1 | 6/2002 | Barts et al. |
| 2003/0050810 | A1 | 3/2003 | Larkin |
| 2003/0163378 | A1 | 8/2003 | Podgurny |
| 2004/0199664 | A1* | 10/2004 | Feldman ................. H04L 45/02 709/238 |
| 2005/0149373 | A1 | 7/2005 | Amling |
| 2005/0197876 | A1* | 9/2005 | Benda .................... G06Q 10/04 705/333 |
| 2005/0246192 | A1 | 11/2005 | Jauffred et al. |
| 2007/0214026 | A1* | 9/2007 | Cheng ............. G06Q 10/06316 705/7.26 |
| 2008/0046302 | A1 | 2/2008 | Cartwright |
| 2008/0065262 | A1 | 3/2008 | Gottlieb |
| 2009/0030770 | A1 | 1/2009 | Hersh |
| 2009/0037234 | A1 | 2/2009 | Gabrielson |
| 2009/0055232 | A1 | 2/2009 | Bruno et al. |
| 2009/0301038 | A1 | 12/2009 | Gabrielsen et al. |
| 2010/0049537 | A1 | 2/2010 | Erie |
| 2012/0226624 | A1* | 9/2012 | Song .................... G06Q 10/083 705/338 |
| 2013/0096973 | A1* | 4/2013 | LaVoie ............. G06Q 10/06315 705/7.22 |
| 2013/0159208 | A1* | 6/2013 | Song ...................... G06Q 10/08 705/338 |
| 2013/0317929 | A1* | 11/2013 | Schnorf ................. G06Q 10/08 705/26.3 |
| 2013/0339076 | A1* | 12/2013 | Baranda ................. G06Q 10/08 705/7.17 |
| 2014/0019288 | A1* | 1/2014 | Bossinakis ....... G06Q 10/06315 705/26.4 |
| 2014/0172576 | A1* | 6/2014 | Spears ............... G06Q 30/0266 705/14.63 |
| 2015/0008733 | A1 | 1/2015 | Periot |
| 2016/0042321 | A1* | 2/2016 | Held .................. G06Q 10/0838 705/338 |
| 2016/0189066 | A1* | 6/2016 | Liao ...................... G06Q 10/06 705/6 |

FOREIGN PATENT DOCUMENTS

| | | |
|---|---|---|
| EP | 2109072 A1 | 10/2009 |
| WO | WO 2005090171 A1 | 9/2005 |
| WO | WO 2008137083 | 11/2008 |
| WO | WO 2011072253 | 6/2011 |

OTHER PUBLICATIONS

Final Office Action dated Sep. 9, 2016 for related U.S. Appl. No. 14/107,603.
Ortec, "Solution: Pallet and Load Building", Date Accessed: Dec. 13, 2012, 4 pages, url: http://www.ortec.com/solutions/pallet_and_load_building.aspx.
Logen Solutions, Co., "Truck, Container and Pallet Loading Software", Mar. 11, 2012, 2 pages.
IBM, "Transportation Planning and Optimization", Mar. 23, 2012, 2 pages.
JDA, "Transporation & Logistics Management" JDA Software: Synchronizing Supply Chain Execution with Complete Visibility into Inventory, Costs, and Performance, Brochure, Jun. 5, 2012, 16 pages.
SAP Library—Transportation Planning/Vehicle Scheduling (TP/VS)) "Optimization", May 5, 2012, 1 page.
John G. Klincewicz, Operations Research, "Solving a Freight Transport Problem Using Facility Location Techniques", Jan./Feb. 1990, vol. 38 No. 1, 1 page.
G.G. Brown, et al., "Consolidation of Customer Orders into Truckloads at a large Manufacturer", The Journal of the Operational Research Society, vol. 48, Issue 8, Aug. 1997, 9 pages.
RedPrairie "COPLEX Routing Optimization" Apr. 3, 2009, 2 pages.
RedPrairie "Driving Out Costs and Increasing Customer Service Through Advanced Transportation Management" 2009, 12 pages.
RedPrairie, "Pallet & Load Optimization", Apr. 6, 2009, 2 pages.
Non-final Office Action dated Mar. 11, 2016 for related U.S. Appl. No. 14/107,603.
Non-final Office Action dated Feb. 24, 2017 for related U.S. Appl. No. 14/107,698.
Non-final Office Action dated Feb. 24, 2017 for related U.S. Appl. No. 14/107,814.
Non-final Office Action dated Apr. 20, 2017 for related U.S. Appl. No. 14/107,603.
Final Office Action dated Jun. 20, 2017 for related U.S. Appl. No. 14/107,698.
Final Office Action dated Jun. 20, 2017 for related U.S. Appl. No. 14/107,814.
Final Office Action dated Nov. 1, 2017 for relatd U.S. Appl. No. 14/107,603.
Jadhav, Spriya Arun, "On Export Intermodal Transportation Problem" (2012). Theses and Dissertaions. 620.
Notice of Allowance dated Jan. 23, 2018 for related U.S. Appl. No. 14/107,698.
Notice of Allowance dated Feb. 27, 2018 for related U.S. Appl. No. 14/107,814.

\* cited by examiner

COST AND LATENCY REDUCTIONS THROUGH DYNAMIC UPDATES OF ORDER MOVEMENT THROUGH A TRANSPORTATION NETWORK

RELATED APPLICATIONS

The present application claims the benefit of priority to U.S. Provisional Patent Application Ser. No. 61/740,443, entitled "SYSTEMS METHODS AND APPARATUS FOR DYNAMIC CLUSTERING", filed Dec. 20, 2012; and the present application claims the benefit of priority to U.S. Provisional Patent Application Ser. No. 61/785,583, entitled "SYSTEMS METHODS AND APPARATUS FOR DYNAMIC CLUSTERING", filed Mar. 14, 2013, both of which are hereby incorporated by reference in their entirety.

The present application is related to co-pending U.S. patent application Ser. No. 14/107,814, entitled "FINDING MINIMUM COST TRANSPORTATION ROUTES FOR ORDERS THROUGH A TRANSPORTATION NETWORK", filed on even date herewith, which is hereby incorporated by reference in its entirety; and the present application is related to co-pending U.S. patent application Ser. No. 14/107,865, entitled "A CARRIER CAPACITY AWARE MULTI-STOP SHIPMENT GENERATOR", filed on even date herewith, which is hereby incorporated by reference in its entirety; and the present application is related to co-pending U.S. patent application Ser. No. 14/107,603, entitled "CONCURRENT DETERMINATION OF SHIPPING MODE AND SHIP UNIT PACKING DURING TRANSPORTATION PLANNING", filed on even date herewith, which is hereby incorporated by reference in its entirety and the present application is related to co-pending U.S. patent application Ser. No. 14/107,698, entitled "COST AND LATENCY REDUCTIONS THROUGH DYNAMIC UPDATES OF ORDER MOVEMENT THROUGH A TRANSPORTATION NETWORK", filed on even date herewith, which is hereby incorporated by reference in its entirety.

Certain aspects in some embodiments of the present application are related to material disclosed in U.S. patent application Ser. No. 13/111,120, entitled "FRAMEWORK FOR OPTIMIZED PACKING OF ITEMS INTO A CONTAINER", filed on May 19, 2011, which is hereby incorporated by reference in its entirety.

FIELD

The disclosure relates to the field of enterprise software application modules for order management and shipping/transportation management and more particularly to techniques for achieving cost and latency reductions through dynamic updates of order movement through a transportation network.

BACKGROUND

The transportation of goods from point of origin to a destination plays an important role in the world economy, and often goods are to be moved through a complex network of carriers. In the context of global commerce, delivery of an order to a destination from the point of manufacture or packaging may traverse various legs comprising (for example) an overland segment (e.g., by truck), a segment across an ocean (e.g., by seagoing vessel), possibly an air segment (e.g., by aircraft), and in some cases even additional segments (e.g., additional overland segments) before reaching a final destination. Some order management systems propose static routing for orders, and techniques for such routing may account for shipment using as many legs as may be needed to route from a source location to a destination location. Some systems attempt to account for practical considerations (e.g., timing of delivery) as well as efficiency considerations (e.g., aggregate cost incurred by traversing all legs of an itinerary), yet these legacy techniques fall short.

Some management systems propose routing for orders based on optimization of traversals over a transportation network using the original source-point of an order and the final intended destination route-point of the order, and then consolidate orders after finding a sufficiently fast and sufficiently low-cost itinerary. However, as the number of geographically-nearby source points becomes larger (e.g., when shipping a relatively larger number of relatively smaller orders) this approach to routing often still leaves the routing from original source-point of an order to a consolidation point (e.g., a crossdock, a port, etc.) unaddressed. A (newer) order may be available for shipment in the same or nearby location where a truck is transporting (older) orders, however without employing the disclosed techniques, that newer order might not be picked up by the truck—even though the truck is in the right location to pick up the newer order, and even though the truck has enough capacity to transport the newer order.

Indeed, legacy order management systems make unwarranted assumptions, and propose routing for orders only after simplifying routing problem by collapsing a large group (e.g., possibly hundreds or more) of geographically-nearby route-points into a single route-point (e.g., a route-point that is geographically-representative of the large group). Including these unwarranted assumptions in order to reduce or simplify the routing problem leads to poor routing plans, and what is needed are techniques to avoid making the aforementioned unwarranted assumptions while still being able to solve or optimize the overall routing problem. Such legacy approaches make unwarranted assumptions at least in that they build pallets (e.g., grouping based on geographically-nearby route-points) and then assess the mode of shipment to transport the pallet(s). This approach limits the possibilities for shipment modes since once a pallet is built it cannot be easily split (e.g., to account for a change in transportation mode, or to account for an additional mode or route).

What is needed is a technique or techniques that assemble a set of candidate pallet packing possibilities, and then assess the candidate packing possibilities to identify low cost and feasible routes.

Further, legacy systems fail to account for changes in the status of orders once a routing plan has been determined. For example, a plan to pick up (e.g., via overland carrier) five orders from Springfield, Ill. to be delivered to a port at Chicago, Ill. might have been planned and disseminated to the carrier or carriers. Yet, that overland movement from Springfield to Chicago takes more than a day end-to-end. During the period of the overland movement, new orders might arrive (e.g., new orders ready for pick-up in a suburb of Chicago), and those new orders might be efficiently picked up en route to Chicago.

Legacy techniques are rife with erroneous assumptions. What's needed are techniques that eliminate or ameliorate erroneous assumptions in order to achieve cost and latency reductions when shipping through a transportation network.

SUMMARY

The present disclosure provides an improved method, system, and computer program product suited to address the aforementioned issues with legacy approaches. More specifically, the present disclosure provides a detailed description of techniques used in methods, systems, and computer program products for achieving cost and latency reductions through dynamic updates of order movement through a transportation network.

Embodiments commence upon receiving a first set of orders to be shipped from a source region to a destination region in accordance with a first set of timing constraints, then building a first set of multi-stop shipments, the first set of multi-stop shipments comprising a first multi-stop carrier schedule that satisfies the set of timing constraints. The carrier schedule can then commence (e.g., trucks might make a first pick-up stop). The method waits a calculated duration before receiving a second set of orders to be shipped to the destination region in accordance with a second set of timing constraints. A second set of multi-stop shipments is built, wherein the second set of multi-stop shipments comprises a second multi-stop carrier schedule for at least one stop not included in the first set of multi-stop shipments and wherein the second multi-stop carrier schedule satisfies both the first set of timing constraints and the second set of timing constraints.

In other embodiments, the computer implemented method commences upon accessing a database to receive a first set of orders to be shipped from a source region to a destination region using a transportation network in accordance with a set of given constraints. Processing then proceeds to operations for relaxing at least some of the set of given constraints by reformulating them as relaxed constraints, then using the relaxed constraints when generating a plurality of candidate routing options that satisfy the relaxed constraints. More candidate routing options are generated when using the relaxed constraints (as compared to the number of candidate routing options that would be generated when using the un-relaxed constraints). Given the higher number of candidate routing options that are generated when using the relaxed constraints, there is a higher probability that a lower or lowest cost route can be found. Further, orders can be shipped using the selecting lowest cost routing by identifying an additional set of orders to be shipped in accordance with the selected the lowest cost routing option. Even still more, orders can be shipped using the selected lowest cost routing by delaying for a time period, then identifying an additional set of newly-incoming orders to be shipped in accordance with the selected lowest cost routing.

Further details of aspects, objectives, and advantages of the disclosure are described below and in the detailed description, drawings, and claims. Both the foregoing general description of the background and the following detailed description are exemplary and explanatory, and are not intended to be limiting as to the scope of the claims.

DETAILED DESCRIPTION

Figure 1A:
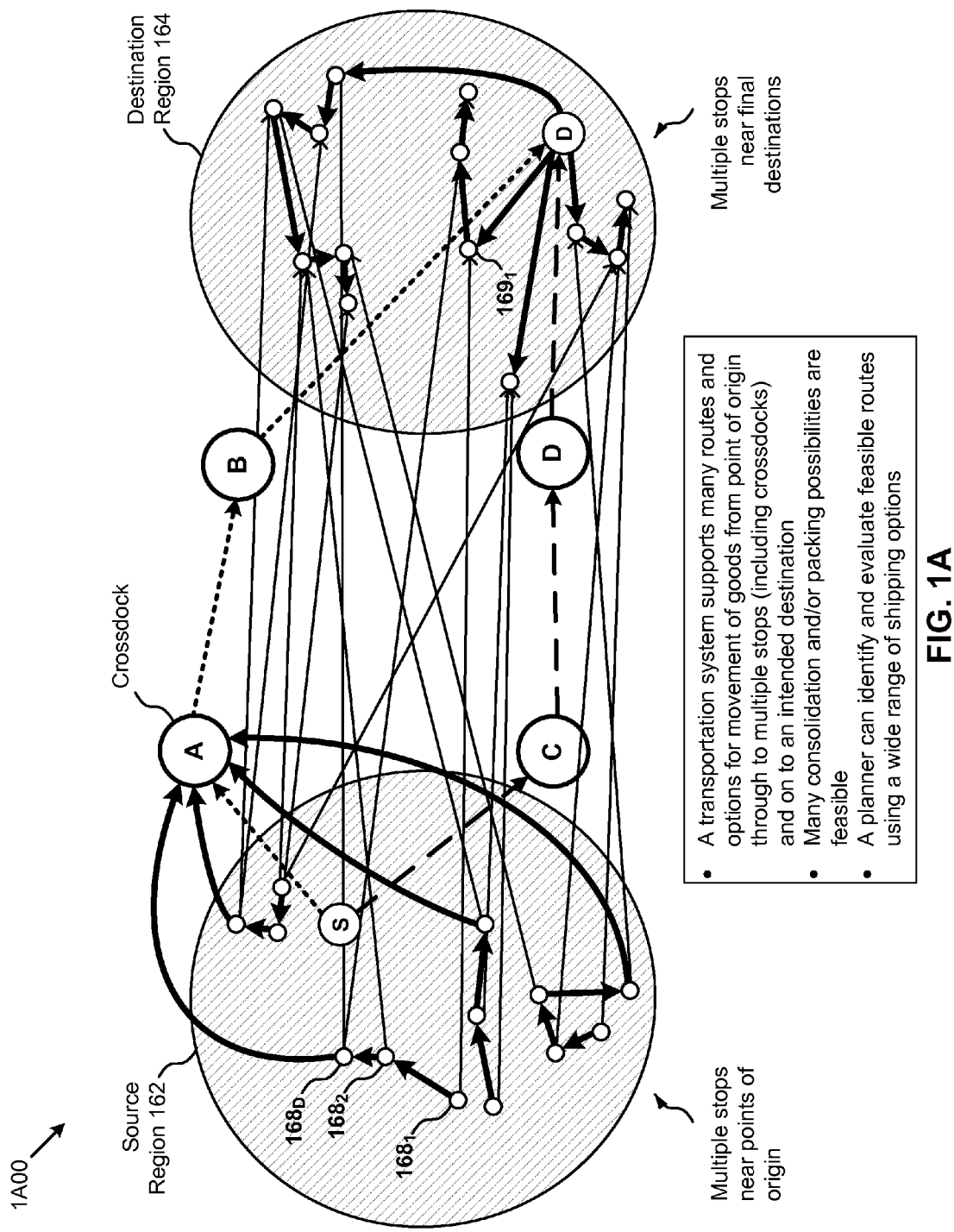
FIG. 1A presents a schematic representation of a multi-mode transportation network as used by systems for achieving cost and latency reductions through dynamic updates of order movement through a transportation network, according to some embodiments.

Some embodiments of the present disclosure address the problem of managing shipments of goods over multi-mode transportation routes and some embodiments are directed to an improved approach for implementing achieving cost and latency reductions through dynamic updates of order movement through a transportation network.
Overview The use of the herein-disclosed dynamic clustering algorithms enhances the overall quality of routing decisions for orders. Transportation options generated by the herein-disclosed clustering techniques eschew erroneous assumptions, and can thus create many additional feasible routing possibilities for the orders. Since the orders have more possibilities by which to traverse through the transportation network, the network routing problem solver has a higher chance of finding lower cost transportation routes for the orders in aggregate.

The herein-disclosed techniques consolidate materials to be shipped by assembling a set of candidate consolidation packing possibilities (e.g., candidate pallet packing possibilities), and then assess the candidate consolidation possibilities to identify low cost and feasible routes using the range of available shipping modes so as to consolidate (e.g., build pallets) in a manner that transports the orders over the identified low cost and feasible routes. Following this technique, more possibilities (e.g., more combinations of things to be moved, and ways to move the things) are considered in the problem description, so solution approaches offer at least the possibility that more efficient routes can be identified.

As an example, consider an order "OrderA" in Springfield, Ill. intended for Hamburg, Germany And consider an order "OrderB", in Joliet, Ill. also intended for Hamburg, Germany. A naïve route plan will move OrderA to a port in Chicago (e.g., using "CarrierA"), and will move OrderB to that same port in Chicago (e.g., using "CarrierB") and then consolidate both OrderA and OrderB into an overseas container destined for Hamburg, Germany. However, a movement plan that takes into account a "multi-stop" movement plan might use only one carrier (e.g., CarrierA) to pick up both OrderA (from Springfield) and also pick up OrderB (from Joliet). Given the option (e.g., existence of a multi-drop carrier, CarrierA), and costs and timing constraints, a network solver can be tasked to optimize such a movement plan, and the network solver could consider if the impacts (in terms of costs and latency) of the second stop are outweighed by the savings (in terms of costs and latency) of not using CarrierB. In more formal terms, according to one embodiment, if the problem includes order movement options for a group of orders, then the enumeration of feasible paths (e.g., overland movements) can be provided as input to a network solver. Then, since additional paths are considered in the problem description, this embodiment offers at least the possibility that more efficient routes can be identified for the orders as a group.

The foregoing is merely one example of multiple shipments that have the possibility to be routed using a common carrier (e.g., a carrier that offers the option of multi-stop routing movements). Yet, still further techniques provide for including additional orders by extending a multi-stop route plan to include still more order pick-up instructions even after the overland leg has commenced. In some cases, cost and latency reductions can be achieved through dynamic updates of order movement through a transportation network even as late as just prior to arrival of a final overland consolidation point. Techniques for adding a new order to an overland leg are discussed in detail in the following descriptions.

Routing Overview

Routing can be described using itineraries, and itineraries can be single leg or multi-leg. Carriers that provide movement of goods often coordinate among themselves to create a transportation network. Strictly as examples, transportation networks can support multiple itineraries, and the carriers within a transportation network can service one or more legs within a given itinerary. Itineraries can come in various forms:

Multi-leg itineraries where each order is transported on each leg using only one carrier. An example is a three leg land-ocean-land itinerary, where the first land leg represents shipping directly from the order source to the departure port, the ocean leg is oceangoing, and the last land leg represents movement of goods from the arrival port to the order destination. A leg can comprise multiple stops, such as in the aforementioned stops in Springfield, Ill. and in Joliet, Ill.

Itineraries can include a crossdock which serves consolidation functions. For example, the aforementioned port in Chicago can facilitate amalgamation of orders into an overseas container destined for Hamburg, Germany.

A multi-leg itinerary where throughpoints can be used on one or more of the legs. An example is a three leg land-ocean-land itinerary, where the first land leg goes through a crossdock so that an order can be on two shipments on that leg, one from the order source to the crossdock, and another from the crossdock to the departure port.

A single-leg itinerary where more than one crossdock is present. Such a single-leg itinerary may also include consolidation pools or deconsolidation pools.

A single-leg itinerary where a network of throughpoints is defined. All possible routes from the starting point of the leg to the ending point of the leg can be determined from a network, and a route can be defined as a series of traversals through a sequence of throughpoints. A series of traversals through a sequence of throughpoints can be considered to be a network of throughpoints.

A multi-leg itinerary where one or more of the legs traverses a network of throughpoints.

A given leg of an itinerary (e.g., a leg serviced by an overland carrier) can include multiple stops while still observing the endpoints of the leg of the itinerary.

The inclusion of multiple order pick-up stops (while still observing the endpoint of the last leg of the itinerary) can become complicated by various constraints pertaining to the orders themselves. To illustrate further, order-specific options and/or constraints might be present. For example, although milk can be shipped by CarrierA and fertilizer can be shipped by CarrierA, an order comprising fertilizer cannot be shipped with milk, even if the orders are on the same leg and would otherwise be a candidate for a multi-stop shipment. As additional examples of constraints, constraints can include:

Pickup timing constraints.
Delivery timing constraints.
Outbound port or crossdock arrival constraints.
Arrival port or crossdock arrival constraints.
Maximum crossdock waiting time.
Maximum number of legs constraints.
Maximum overland time.
Preferred carrier constraints.

Additional constraints are presented elsewhere in this disclosure. Pertaining to some embodiments, the following terms are presented merely to be illustrative of the descriptions herein.

TABLE 1

Sample terms and sample uses

| Term | Sample Usage |
|---|---|
| Throughpoint | A throughpoint is an intermediate location such as a crossdock or a pool. A throughpoint is defined as a location and a location role (e.g., a crossdock serves consolidation functions). |
| Itinerary Leg | An itinerary leg can be part of an itinerary, but it cannot be part of a routing network. |
| Network Leg | If a leg has a leg type of "NETWORK LEG", it can be part of a routing network, but not one of the legs on an itinerary. A |

TABLE 1-continued

Sample terms and sample uses

| Term | Sample Usage |
|---|---|
| | network leg specifies both a source and destination. The source/destination can be either a region or a throughpoint (e.g., a combination of location and location role). |
| Routing Network | An itinerary leg can have a routing network, which is a set of network legs that represent the transportation network between the itinerary leg source and its destination. |
| Parent Order Movement | A parent order movement is an order movement on an itinerary leg with a routing network. (The parent order movement might not yet have child order movements if it has not yet been routed through the routing network.) |
| Child Order Movement | A child order movement is an order movement on a network leg. (A child order movement should always have a parent.) |
| Ordinary Order Movement | An ordinary order movement is an order movement on an itinerary leg with no routing network. |
| Representative Location | A region can have a representative location. Typically, the representative location should be some location contained in the region that can stand in for all other locations in the region. This allows the region to be treated like a location for the cases of distance and transit time calculations and rating. |

The engines and algorithms described herein serve to identify possibilities for grouping (e.g., consolidating) components of orders in groups that are likely to travel together on a given leg (e.g., because they are bound for the same or nearby route points such as point of origin, destination point, throughpoint, multi-stop points, etc.). The identified possibilities can then be considered for mapping into routes (e.g., order movement plans) that considers costs while concurrently observing constraints (e.g., timing constraints and other practical constraints) that apply to the components of the orders.

Definitions

Some of the terms used in this description are defined below for easy reference. The presented terms and their respective definitions are not rigidly restricted to these definitions—a term may be further defined by the term's use within this disclosure.

The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances.

The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

DESCRIPTIONS OF EXEMPLARY EMBODIMENTS

FIG. 1A presents a schematic representation of a multi-mode transportation network 1A00 as used by systems for achieving cost and latency reductions through dynamic updates of order movement through a transportation network. As an option, the present transportation network 1A00 may be implemented in the context of the architecture and functionality of the embodiments described herein. Also, the transportation network 1A00 or any aspect therein may be implemented in any desired environment.

The small circular symbols represent orders (e.g., first order $168_1$, second order $168_2$, dynamic add-on order $168_D$, etc.). As shown on the left side of the figure, orders originate within a source region 162 and are destined for delivery to locations in a destination region 164. As an example, consider order $168_1$ that is intended for delivery to location $169_1$. Such an order could be routed to a regional consolidation point (e.g., see "crossdock A" of FIG. 1A, see crossdock 125 of FIG. 1B). Also, consider order $168_2$ that is intended for delivery to location in the same region as location $169_1$ (e.g., destination region 164). Such an order could also be routed to a regional consolidation point (e.g., crossdock A). However, given the relative proximity of the pick-up location for first order $168_1$ to the pick-up location for second order $168_2$, it might be advantageous for the carrier assigned to pick-up first order $168_1$ to also pick-up second order $168_2$. The determination as to whether or not it might be advantageous depends on many factors, namely costs, timing, existence of feasible alternatives, and other factors. Determining the degree of advantage and/or finding an optimal order clustering configuration can be addressed by a network solver that uses an objective function. Yet, in order for a network solver to evaluate alternatives (and eliminate infeasible ones), the network solver needs to be provided with enough information to perform such evaluations. Use of a network solver and various technical advances so as to reduce or eliminate assumptions that lead to non-optimal solutions are discussed in detail below.

Continuing with the discussion of FIG. 1A, a network solver might determine that a then-optimal movement of first order $168_1$ to crossdock A should include a same-carrier movement of second order $168_2$ to crossdock A, and instructions might be sent to the carrier to proceed with the multi-stop route to pick up the first order, then the second order, and then proceed to crossdock A. At some point in time, the multi-stop route commences, and some equipment (e.g., a truck) makes a first stop at the location of the first order (see location 169₁). Even at this late point in time (for example, after the movement to crossdock A has commenced) it might be possible that another order appears in the order landscape. In this example, such an order is depicted as dynamic add-on order 168. Even at this late point in time (for example, after the movement to crossdock A has commenced) it might be possible that instructions can be provided to the carrier to pick-up dynamic add-on order 168$_D$.

To facilitate this, the aforementioned network solver is executed repeatedly, for example, whenever a new order appears in the order landscape. In some embodiments, a network solver is executed repeatedly only within some prescribed periodicity (e.g., once a day, once and hour, etc.). A filter or discriminator can be provided such that a new order is only deemed to have appeared in the order landscape when the new order has a pick-up location within the same region as the already commenced movement to crossdock A.

The foregoing is merely one example of movement involving late-arriving orders originating at pick-up locations that have the possibility to be routed using dynamically-updated instructions provided to a common carrier. Use of such dynamically-updated instructions to achieve cost and latency reductions can be implemented in the context of a multi-mode shipping network (e.g., a transcontinental multi-mode shipping network). Such a multi-mode shipping network involving land, sea and air modes of transportation are discussed in the following FIG. 1B.

Figure 1B:
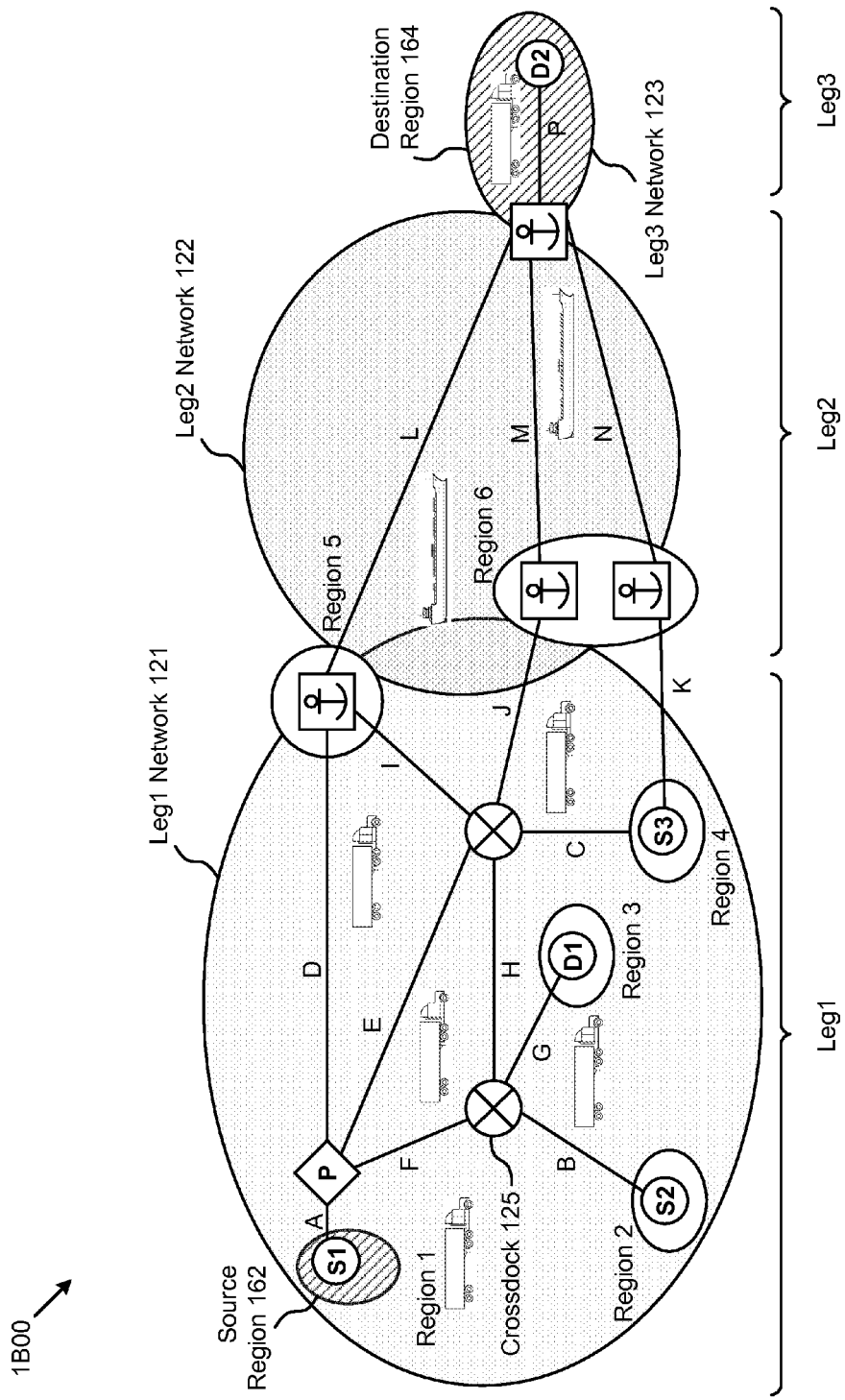
FIG. 1B presents a schematic representation of a multi-mode transportation network as used by systems for achieving cost and latency reductions through dynamic updates of order movement through a transportation network, according to some embodiments.

FIG. 1B presents a schematic representation of a multi-mode transportation network 1B00 as used by systems for achieving cost and latency reductions through dynamic updates of order movement through a transportation network. As an option, the present transportation network 1B00 may be implemented in the context of the architecture and functionality of the embodiments described herein. Also, the transportation network 1B00 or any aspect therein may be implemented in any desired environment.

As shown, the multi-mode transportation network 1B00 comprises three legs: Leg1, Leg2, and Leg3. Leg1 is an overland leg that corresponds to the source region 162 as shown in FIG. 1A. Leg2 is an overseas leg, and Leg3 is another overland leg that corresponds to the destination region 164. Within each leg is a network of carriers capable of transporting goods from point to point over the shown segments. For example, the overland Leg1 comprises a network of carriers (e.g., network 121), the overseas Leg2 comprises carriers (e.g., network 122), and Leg3 comprises a network of carriers (e.g., network 123).

Now, consider a shipment from source point S1 to destination point D2. As shown, the shortest path from S1 is through segments A, D, L, and P to reach destination point D2. Various techniques can be applied to minimize cost and meet time constraints while calculating the best-way to route from source point S1 to reach destination point D2, yet such techniques do not address the multi-stop optimization of FIG. 1A, and such techniques do not address dynamic updates of order movement through a transportation network.

What is needed are techniques for performing dynamic updates of order movements in the context of a regional and/or transcontinental shipping network. One example of such a technique is discussed in the following FIG. 1C.

Figure 1C:
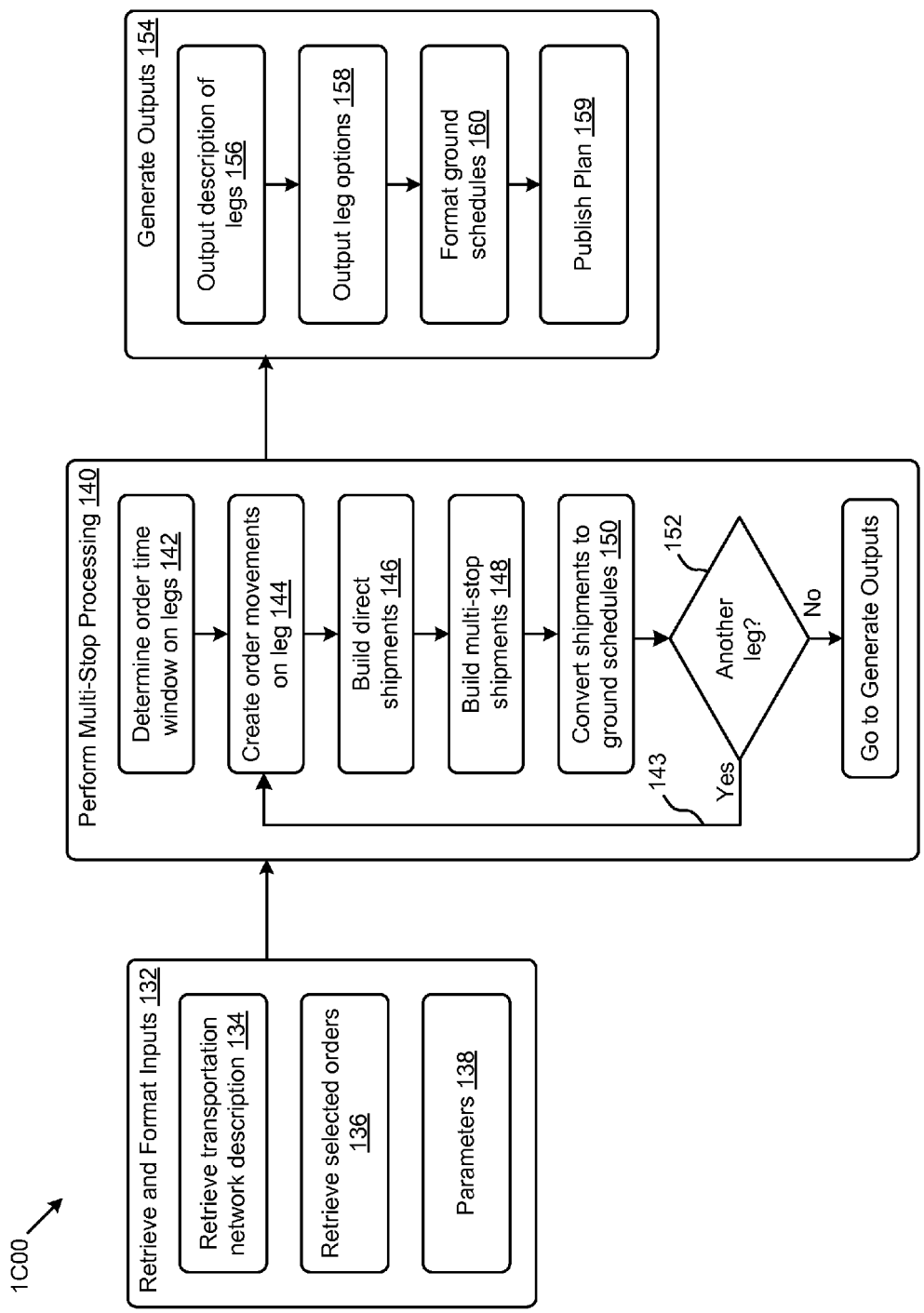
FIG. 1C is a chart of a sample dynamic clustering algorithm as used in systems for achieving cost and latency reductions through dynamic updates of order movement through a transportation network, according to some embodiments.

FIG. 1C is a chart of a sample dynamic clustering algorithm 1C00 as used in systems for achieving cost and latency reductions through dynamic updates of order movement through a transportation network. As an option, the present sample dynamic clustering algorithm 1C00 may be implemented in the context of the architecture and functionality of the embodiments described herein. Also, the sample dynamic clustering algorithm 1C00 or any aspect therein may be implemented in any desired environment.

The shown chart implements an exemplary dynamic clustering algorithm. As shown the processing is divided into three partitions:

a partition to retrieve and format inputs 132;
a partition to generate outputs 154; and
a partition to perform multi-stop processing 140.

The partition to retrieve and format inputs 132 includes tasks to retrieve a transportation network description 134. This description can come in the form of a graph of nodes, or can come in the form of a database table that comprises nodes and edges. Also, the partition to retrieve and format inputs 132 includes a task to retrieve selected orders 136. Strictly as an example, the selected order can comprise a set of orders for which the source location of the order is within a particular region. Or, the selected order can comprise a set of orders for which the source location of a second selected order is proximal to a first selected order. Or, orders can be selected on the basis of time-oriented characteristics.

In addition, parameters 138 are retrieved. Parameters can be used to define values that are in turn used in multi-stop processing. For example, parameters can be used to define values that are in turn used in the operations to perform multi-stop processing 140.

In some embodiments, the operations to perform multi-stop processing proceed by determining durations of time that a corresponding order would be undergoing movement within a particular leg (see operation 142). In determining the durations of time that a corresponding order would be undergoing movement within a particular leg, some embodiments performs shortest path processing on the order by mapping it onto a transportation network to determine the time duration spent on each of the legs. Four components of the time duration windows are computed:

earliest start time,
latest start time,
earliest finish time, and
latest finish time.

In some cases, two passes of calculations are used to determine the shortest path. In one pass, a forward progression is used to calculate the earliest arrival time at each node and, in a second pass, a backward progression is used to determine the latest time at each node. Slack times can be calculated using any known technique.

In determining the above-listed four time duration windows, it can happen that the order's destination is unreachable from a particular node (e.g., as may be discovered during the forward pass) or, an order's source is not reachable from a particular node (during the backward pass). In such cases, the legs corresponding to the orders are not used in the step to create order movements.

Within an iteration loop over the legs (e.g., see return path 143), the following steps are performed for each leg for which there is at least one order that can use the leg. As a performance improvement step, a flag could be added on the leg or leg consolidation group to identify if a particular leg should be considered for clustering.

Create order movements on leg (see step 144): This step codifies internal order movements on the leg. Later, these order movements on the leg can be used for purposes of consolidation. The order movements can be codified to include time windows attached to, or corresponding to, the order movements that were obtained from the previous steps.

Build direct shipments (see step 146): The order movements are then used by a shipment building process, which in turn generates direct shipments descriptions. Exemplary shipment building processes involve bundling as well as direct shipment building. The result of step 146 is a set of consolidated direct shipments.

Build multi-stop shipments (see step 148): This step 148 is only performed when the leg denotes that it is capable of multi-stopping. In some cases a multi-stop route can be intentionally defeated. For example, a non-stop flight from Bangor, Me. to London, England might be expressly barred from scheduling any stop between the start point and the end point. The multi-stop logic produces consolidated multi-stop shipments.

Convert shipments to ground schedules (see step 150): This takes each of the direct shipments and multi-stop shipments and creates ground schedules, which in turn can be used to deliver multi-stop schedules to the carriers.

The above steps are executed in an iteration loop over the legs. An iteration test is performed (see test 152), and when there are more legs over which to iterate, the processing selects a next leg, and proceeds to create order movements on the next leg (see return path 143). Otherwise, when there are no more legs over which to iterate, the processing proceeds to generate outputs.

In some embodiments, a new leg is cloned from a current leg, and all the leg options that are associated with ground schedules are attached to the cloned leg. The attachment processing can include bookkeeping items such as updating the incoming and outgoing legs of the order's source and destination nodes, and updating the transportation network data structures to add the newly created ground schedules. When the ground schedules are added to the network, the shortest path processing will use these legs (see FIG. 3 and FIG. 4). In this manner the shortest path processing can compute using these improved leg options that reflect true consolidation costs and true latency times.

The partition to generate outputs 154 includes a selection of output generation and formatting steps. As shown, the output generation includes a step to output descriptions of the legs (see step 156), which step may also cooperate with a step to output leg options (see step 158). Ground schedules are formatted to meet a particular standard or requirement from a carrier (see step 160), and a plan is published (see step 159). The published plan can be stored in a database and later retrieved for various purposes. One such purpose is discussed in FIG. 3 (e.g., see the juxtaposition of database 312).

Figure 1D:
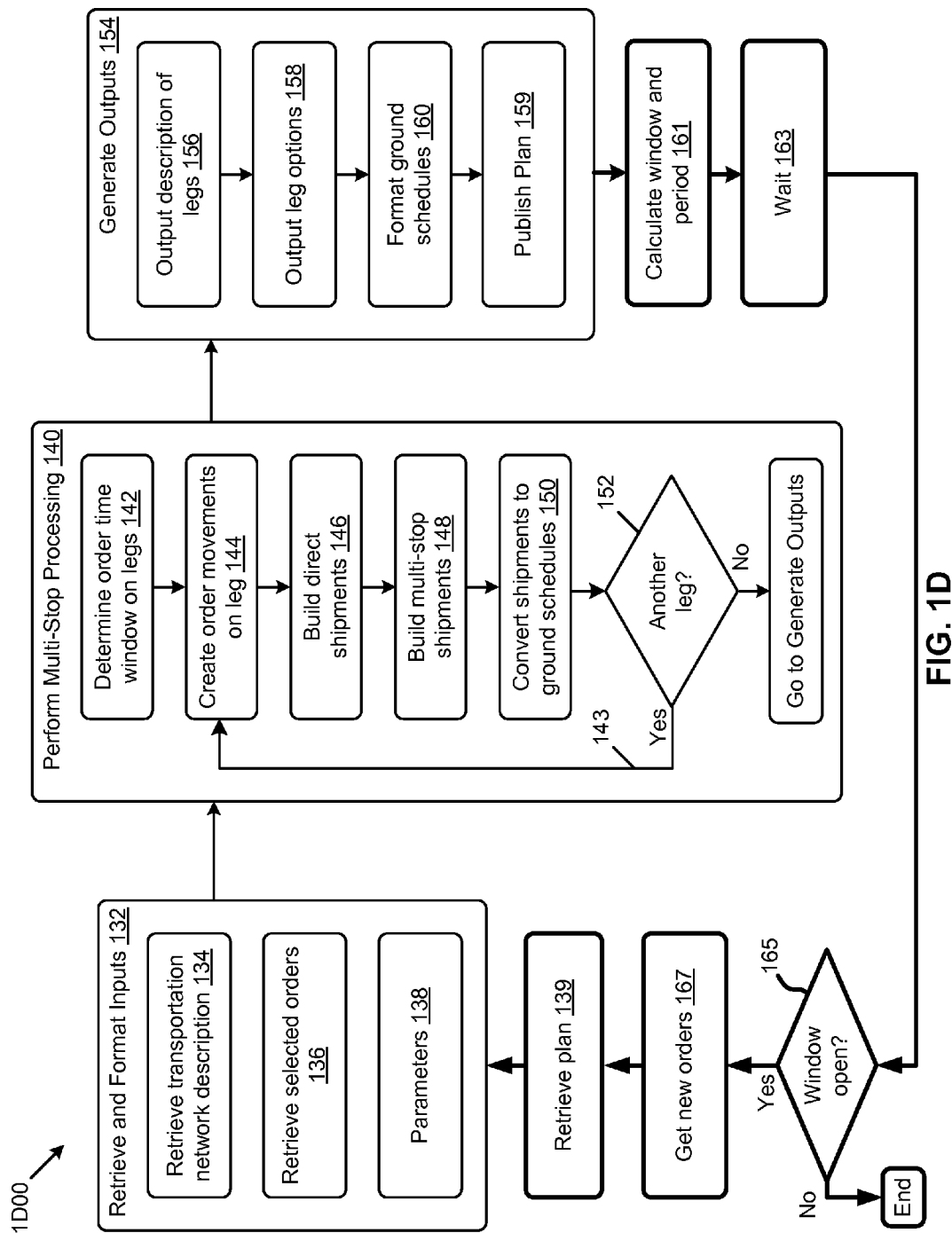
FIG. 1D is a chart of a sample dynamic clustering algorithm as used in systems for achieving cost and latency reductions through periodic dynamic updates of order movement through a transportation network, according to some embodiments.

FIG. 1D is a chart of a sample dynamic clustering algorithm 1D00 as used in systems for achieving cost and latency reductions through periodic dynamic updates of order movement through a transportation network.

As earlier mentioned, the partition to generate outputs 154 includes a step to publish a plan, and the plan can comprise order movements that include time windows. The calculated time windows (see operation to calculate window and period 161) provide units of time appropriate for the mode of transportation used in the leg, and a fraction or multiple of this time unit can be used to calculate a window of time and period (see step 161), and a unit of time to wait (see step 163). For example, in the case of ground transportation, if a "multi-stop" movement plan commences at 9:00 am on a particular day, and is scheduled to reach a terminal by 6:00 pm on that same day, a time window might be deemed to be "by 4:30 pm" and a period might be deemed to be "90 minutes". These times represent the latest time that a new multi-stop instruction could be communicated to the carrier and/or truck driver, and the periodicity under which the dynamic clustering algorithm 1D00 will repeat. In another case, the carrier and/or truck driver might signal arrival at one of the stops of the multi-stop movement plan. In another case, the carrier and/or truck driver might signal availability of capacity while carrying-out the multi-stop movement plan (e.g., after unloading at one of the stops).

There is a latest time that a new multi-stop instruction could be communicated to the carrier and/or truck driver to accommodate a new multi-stop instruction (see decision step 165). The latest time is calculated, and if the window is still open for a new multi-stop instruction, then processing proceeds to get new orders 167 (e.g., new orders that may have come in since the previous check), and the published plan is retrieved (see step 139) in preparation for a possible update to include additional multi-stop instructions.

As earlier mentioned, techniques for dynamic clustering can be used in systems for achieving cost and latency reductions through dynamic updates of order movement through a transportation network, and such a transportation network can be a transcontinental network. Moreover, order movement through a transportation network can involve techniques for late-stage order consolidation (see FIG. 2A) and/or order movement through a transportation network can involve techniques for a relaxed-constraint lowest cost path algorithm (see FIG. 2B).

Figures 2A, 2B:
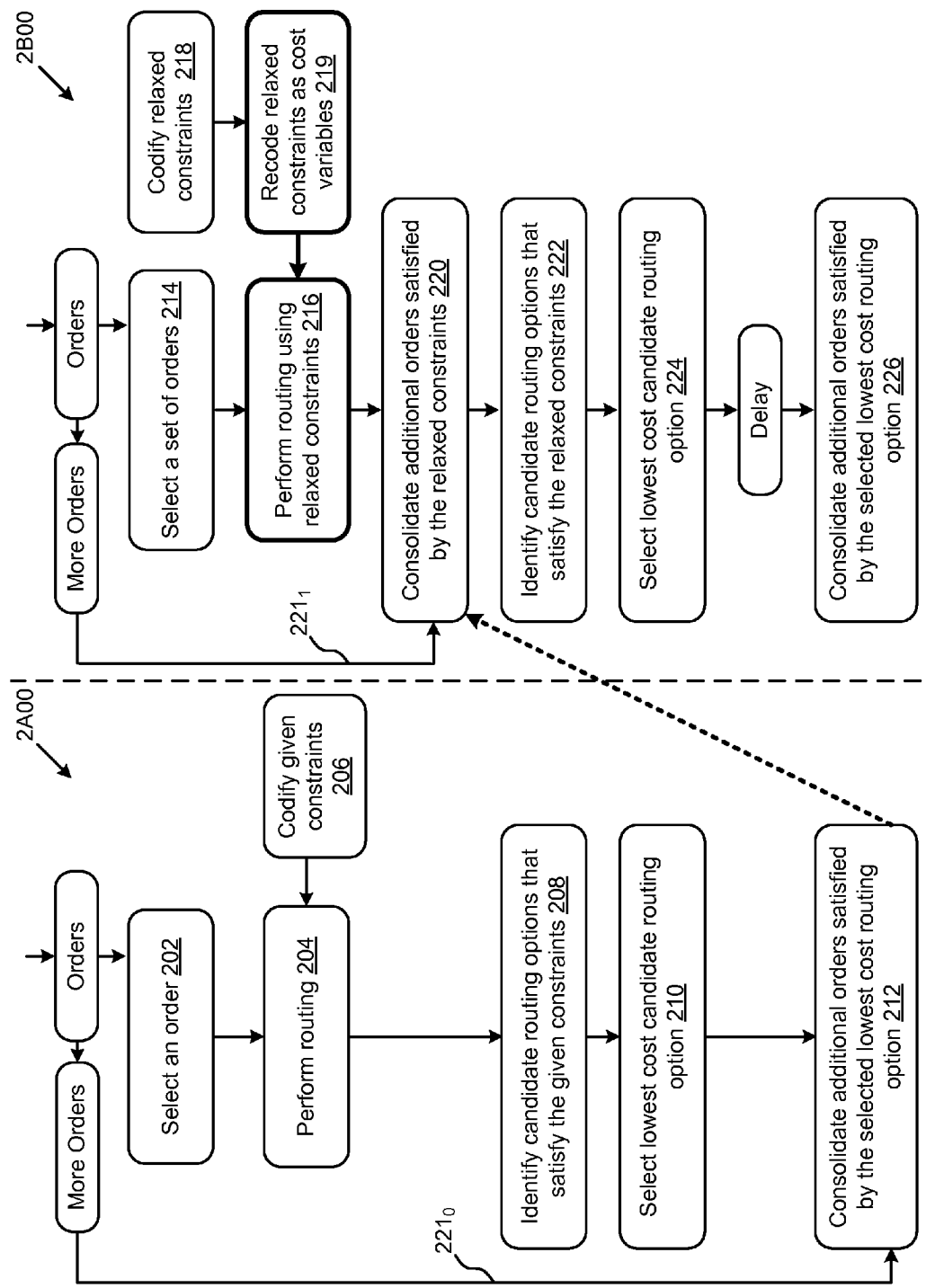
FIG. 2A is a flow diagram of a shortest path algorithm using late-stage order consolidation.
FIG. 2B is a flow diagram of a relaxed-constraint lowest cost path algorithm as used in systems for achieving cost and latency reductions through dynamic updates of order movement through a transportation network, according to some embodiments.

FIG. 2A is a flow diagram 2A00 of a shortest path algorithm using late-stage order consolidation. As shown, the system commences upon selection of an order (see operation 202) and performs routing (see operation 204) using the given constraints (see operation 206). The routing operation can identify candidate routing options that satisfy the given constraints (see operation 208), and the algorithm continues by selecting a lowest cost routing path from among the candidate routing options (see operation 210). Once the lowest cost routing path has been selected, additional orders can be retrieved (see path $221_0$) and consolidated onto the lowest cost routing option where the constraints of the additional orders can be satisfied by the selected lowest cost routing option (see operation 212). Note that order consolidation occurs after a lowest cost routing path has been determined. This technique can be improved upon by relaxing certain constraints before performing routing. Such a technique is discussed as pertains to the following FIG. 2B.

FIG. 2B is a flow diagram of a relaxed-constraint lowest cost path algorithm 2B00 as used in systems for achieving cost and latency reductions through dynamic updates of order movement through a transportation network. As an option, the present relaxed-constraint lowest cost path algorithm 2B00 may be implemented in the context of the architecture and functionality of the embodiments described herein. Also, the relaxed-constraint lowest cost path algorithm 2B00 or any aspect therein may be implemented in any desired environment.

FIG. 2B distinguishes over FIG. 2A in at least the following aspects:

Rather than selecting a representative order (as in operation 202 of FIG. 2A), the relaxed-constraint lowest cost path algorithm 2B00 selects a set of orders (see operation 214) that are considered in the routing steps that are performed using relaxed constraints (see operation 216). Performing routing steps using relaxed constraints results in more routing options (e.g., more legs, and more leg options).

Operation 220 serves to retrieve further orders (see path 221₁), which orders are considered as a group to be consolidated into a path.

Operation 218 serves to codify relaxed constraints. For example (and referring to FIG. 1B) a source in "Region 2" (e.g., "S2") might be relaxed to become a source in "Region 2" or in a neighboring region (e.g., "Region 2" has neighbor regions "Region 1" and "Region 3").

Since the constraints have been relaxed (see operation 218) and since there may be many orders to consider (again, see operation 218) it is possible that there are many more possibilities for routing through the transportation network. Accordingly, the step to perform routing of FIG. 2B may consider many more legs from which to form candidate routing options that satisfy the relaxed constraints.

The relaxed-constraint lowest cost path algorithm 2B00 includes operations to codify relaxed constraints as cost variables (see operation 219). For example, if a constraint were relaxed so as to deem a source in "Region 2" (e.g., "S2") to be considered a source in neighbor region "Region 1", then the operations to codify relaxed constraints as cost variables might offset the relaxation with a penalty that can be used in an optimization step (e.g., see operation 224).

The step to identify candidate routing options that satisfy the relaxed constraints (see operation 222) may identify many more candidate routing options, at least since the act of relaxing the constraints can result in identification of many more nodes in the transportation network.

The operation to select the lowest cost candidate routing option (see operation 224) includes inputs in the form of variables that are used in an optimization (e.g., used as a variable in an objective function).

Operation 226 performs still further consolidation of orders that can match to the selected lowest cost routing option.

Figure 3:
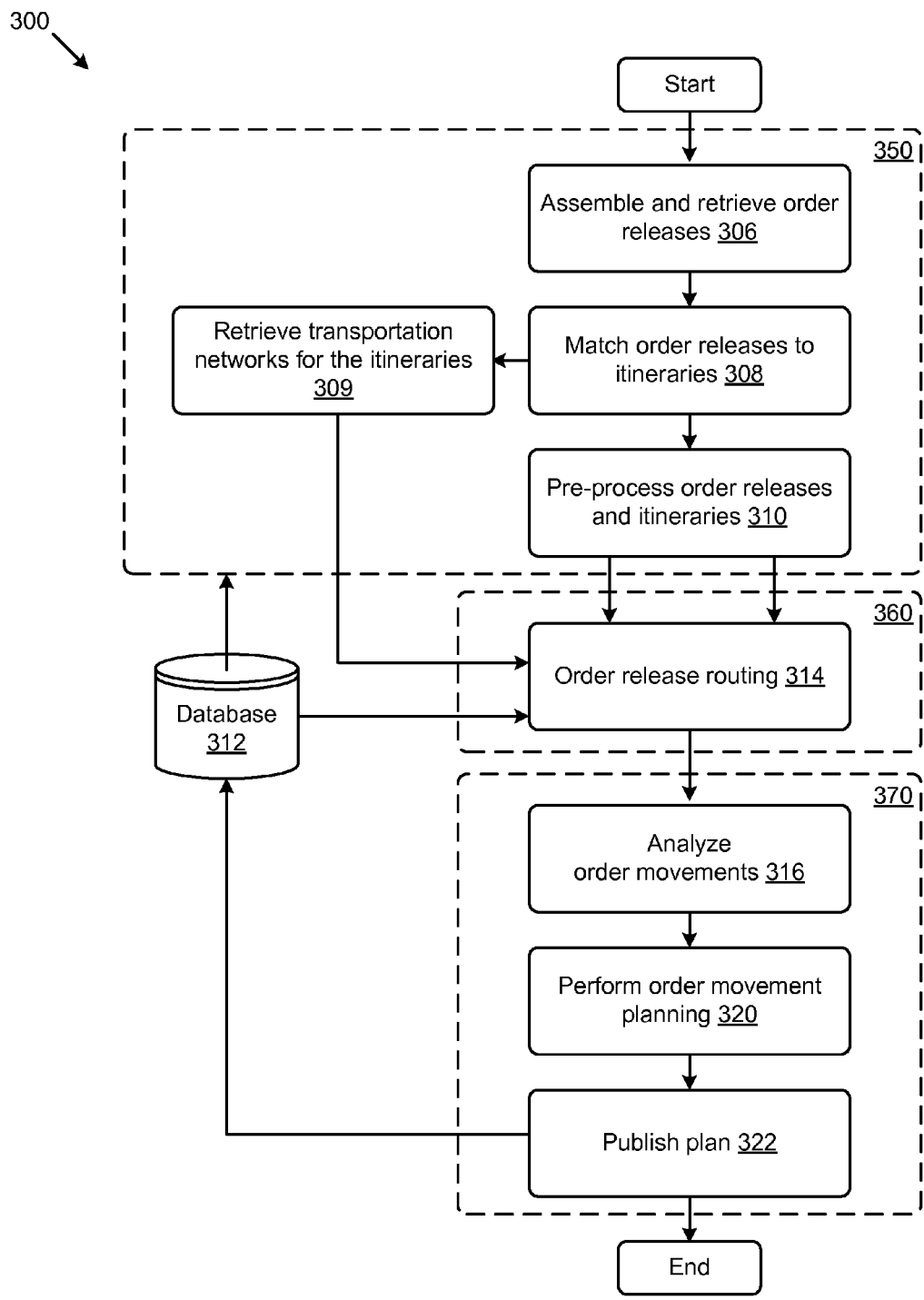
FIG. 3 is a schematic of an order management planning flow as used in systems for achieving cost and latency reductions through dynamic updates of order movement through a transportation network, according to some embodiments.

FIG. 3 is a schematic of an order management planning flow 300 as used in systems for achieving cost and latency reductions through dynamic updates of order movement through a transportation network. As an option, the present order management planning flow 300 may be implemented in the context of the architecture and functionality of the embodiments described herein. Also, the order management planning flow 300 or any aspect therein may be implemented in any desired environment.

Some or all of the techniques discussed in the foregoing can be employed in an enterprise application and can become a part of an overall order management planning flow. As shown, a sequence of steps can collect and prepare data (see partition 350), and the prepared/pre-processed data can become the subject of an order release operation (e.g., see operation 314 and partition 360). The results of an order release routing operation can become the subject of a set of operations for analysis and reporting (e.g., see partition 370). The partitions (e.g., partition 350, partition 360, and partition 370) are purely exemplary and other partitions are reasonable and envisioned.

As shown, partition 350 commences with an operation to assemble and retrieve orders and to sequence or otherwise codify them into an order release data structure (see operation 306), then an operation within partition 350 serves to match order releases to itineraries (see operation 308). In this operation, each given order is matched to all of the active itineraries for which it qualifies (e.g., without violating any given or relaxed constraints). Once order releases have been matched to itineraries, the matches can be pre-processed so as to present the matches in a format as expected by the order release routing algorithm (see operation 314). The order release routing algorithm receives a set of orders (e.g., orders that are matched to one or more itineraries) and enumerates a number of paths that the order can traverse while still meeting the timings and locations of the itineraries. Data structures in the form of order movements are generated for the paths. These order movements are used in subsequent steps (e.g., see order movement planning 320) and in publishing a plan (e.g., see operation 322). The generated order movements can be codified at an itinerary leg level, or can refer to a network, or can be at a network leg level. The published plan can be persistently stored in a database 312. In some cases, the persistently-stored plan can be retrieved by components within the order release routing operation 314 (see partition 360 of FIG. 3 and partition 360 FIG. 4).

Continuing, the order release routing algorithm executes (see partition 360). The order release routing operation receives inputs (see results of operation 310, and results of operation 309) which inputs are then used to find minimum cost transportation routes (e.g., by pre-consolidating orders under relaxed constraints). The minimum cost transportation routes and other results can be analyzed and reported (see partition 370). For example, operations within partition 370 might serve to analyze order movements (see operation 316) and results of such analysis can be provided to operations serving to perform order movement planning (see order movement planning 320). For example, operations serving to perform order movement planning might include advising carriers of a schedule of goods to arrive at one of their facilities. In some cases, the flow of goods is managed by a person or organization which function it is to oversee ongoing order release and movement of goods to the intended destinations. Accordingly, a plan can be prepared and published in various human readable forms (e.g., a printed plan) or computer readable forms (see operation 322).

Now, the order release routing algorithm (see operation 314 and partition 360) can be implemented in a variety of ways without departing from the scope of the claims. Strictly as one example, the following figure presents and discusses one possible implementation of an order release routing flow.

Figure 4:
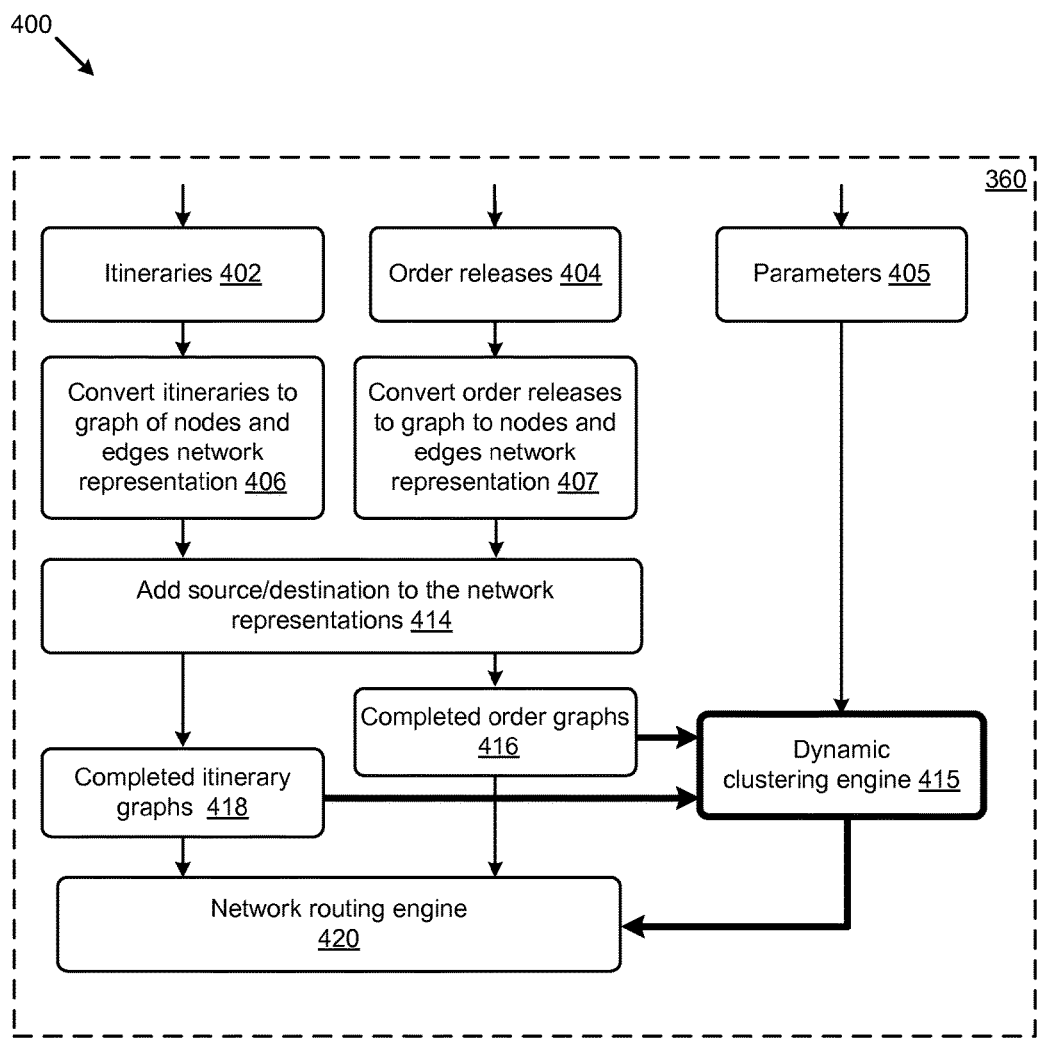
FIG. 4 is a schematic of an order release routing flow as used in systems for achieving cost and latency reductions through dynamic updates of order movement through a transportation network, according to some embodiments.

FIG. 4 is a schematic of an order release routing flow 400 as used in systems for achieving cost and latency reductions through dynamic updates of order movement through a transportation network. As an option, the present order release routing flow 400 may be implemented in the context of the architecture and functionality of the embodiments described herein. Also, the order release routing flow 400 or any aspect therein may be implemented in any desired environment.

As shown, FIG. 4 illustrates one embodiment for converting real-world user-defined itinerary and order data into the network representations suited for use by the network routing engine 420. The partition 360 receives itineraries (see operation 402) and order releases (see operation 404) as provided from the previously-discussed partition 350. The itineraries and order releases are transformed into a network graph and a set of order graph items, which data items describe a set of constraints (e.g., using mathematical and graphical constraint representations).

Strictly as an example within the context of this FIG. 4, itineraries are converted into a network graph of nodes and edges where the nodes represent locations, and the edges represent a means of traveling between the locations. The edges can be annotated so as to include user-defined constraints describing the costs and feasibility of such travel (see operation 406).

Order releases are converted into order graph items, which represent an abstracted form of the orders with respect to the network graph. An order graph item can include constraints such as source and destination nodes, constraints pertaining to quantity, and other constraints. The constraints, taken singly or as a whole, describe how (e.g., under what conditions) or whether (e.g., if a constraint is violated) an order graph item may use network graph edges (see operation 407).

Additional order-specific constraints, including source and destination and related distance and time-related data, can be abstracted from the order releases and added to the network graph (see operation 414).

These transformations produce the abovementioned network graph and order graph items in a format suited for use by the network routing engine 420. Furthermore, these transformations produce completed order graphs 416 and completed itinerary graphs 418 in a form suited for use by the dynamic clustering engine 415.

As earlier indicated, the transformations of partition 360 produce a network graph and order graph items in a format suited for use by the network routing engine 420, yet, in some embodiments the transformations can result in any of a variety of formats, and partition 360 can be configured so as to produce any of a variety of formats suited for use by an alternate network routing engine. As pertaining to the exemplary embodiment of FIG. 4, the formatted data as used by the algorithms in the network routing engine, and the formatted data as used by the algorithms in the dynamic clustering engine can include:

- location-related data;
- constraints representing whether and how travel among locations is feasible;
- abstracted costs, distances, and travel times associated with such locations;
- order source and destination locations;
- order quantities; and
- order constraints.

As shown, partition 360 receives itineraries (see operation 402) and order releases (see operation 404) as provided from the previously-discussed partition 350. Additionally, and as shown, the partition 360 receives parameters 405 suited for use by the dynamic clustering engine 415.

Additional Embodiments of the Disclosure

Figure 5:
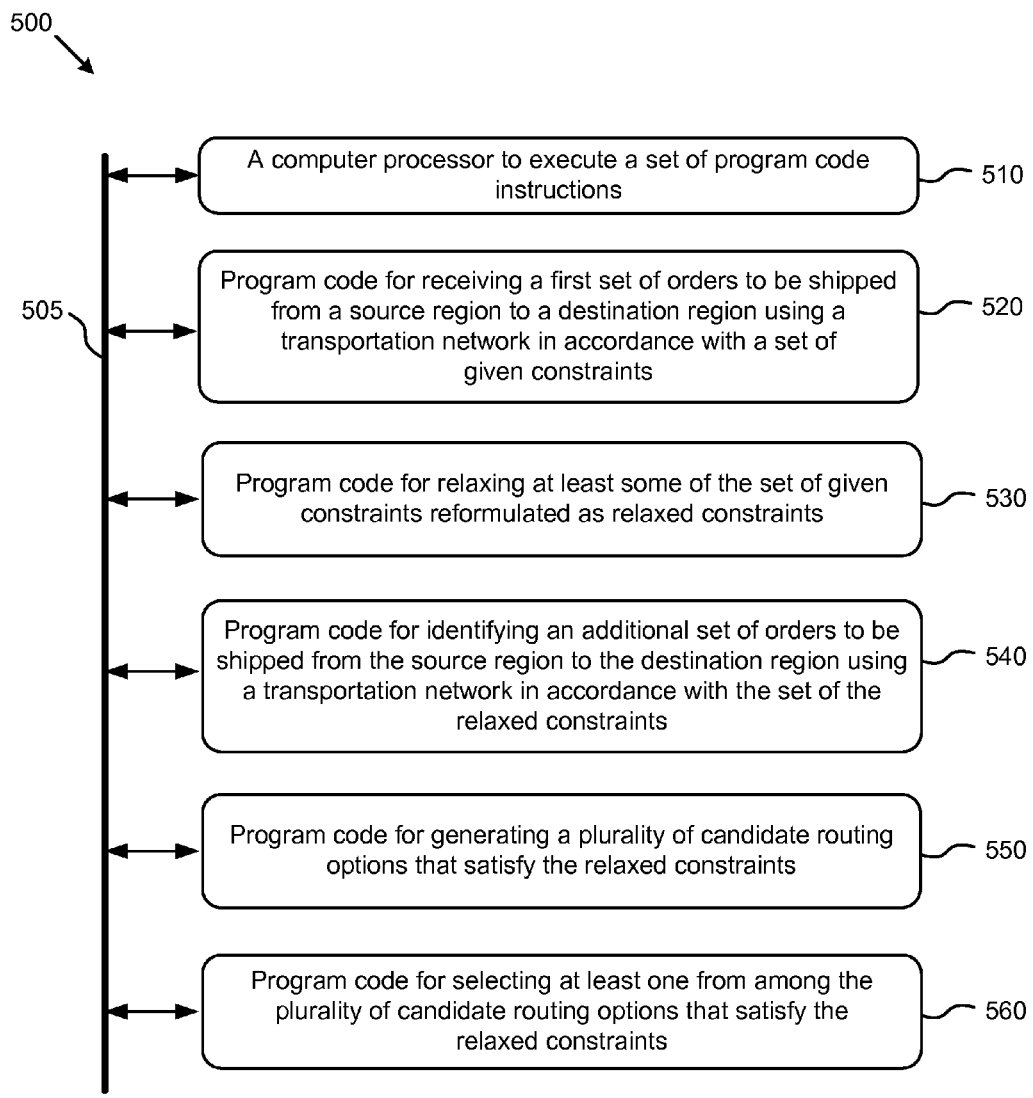
FIG. 5 is a block diagram of a system for achieving cost and latency reductions through dynamic updates of order movement through a transportation network, according to some embodiments.

FIG. 5 is a block diagram of a system for achieving cost and latency reductions through dynamic updates of order movement through a transportation network, according to some embodiments. FIG. 5 depicts a block diagram of a system to perform certain functions of a computer system. As an option, the present system 500 may be implemented in the context of the architecture and functionality of the embodiments described herein. Of course, however, the system 500 or any operation therein may be carried out in any desired environment.

As shown, system 500 comprises at least one processor and at least one memory, the memory serving to store program instructions corresponding to the operations of the system. As shown, an operation can be implemented in whole or in part using program instructions accessible by a module. The modules are connected to a communication path 505, and any operation can communicate with other operations over communication path 505. The modules of the system can, individually or in combination, perform method operations within system 500. Any operations performed within system 500 may be performed in any order unless as may be specified in the claims. The embodiment of FIG. 5 implements a portion of a computer system, shown as system 500, comprising a computer processor to execute a set of program code instructions (see module 510) and modules for accessing memory to hold program code instructions to perform: receiving a first set of orders to be shipped from a source region to a destination region using a transportation network in accordance with a set of given constraints (see module 520); relaxing at least some of the set of given constraints reformulated as relaxed constraints (see module 530); identifying an additional set of orders to be shipped from the source region to the destination region using a transportation network in accordance with the set of the relaxed constraints (see module 540); generating a plurality of candidate routing options that satisfy the relaxed constraints (see module 550); and selecting at least one from among the plurality of candidate routing options that satisfy the relaxed constraints (see module 560).

Figure 6:
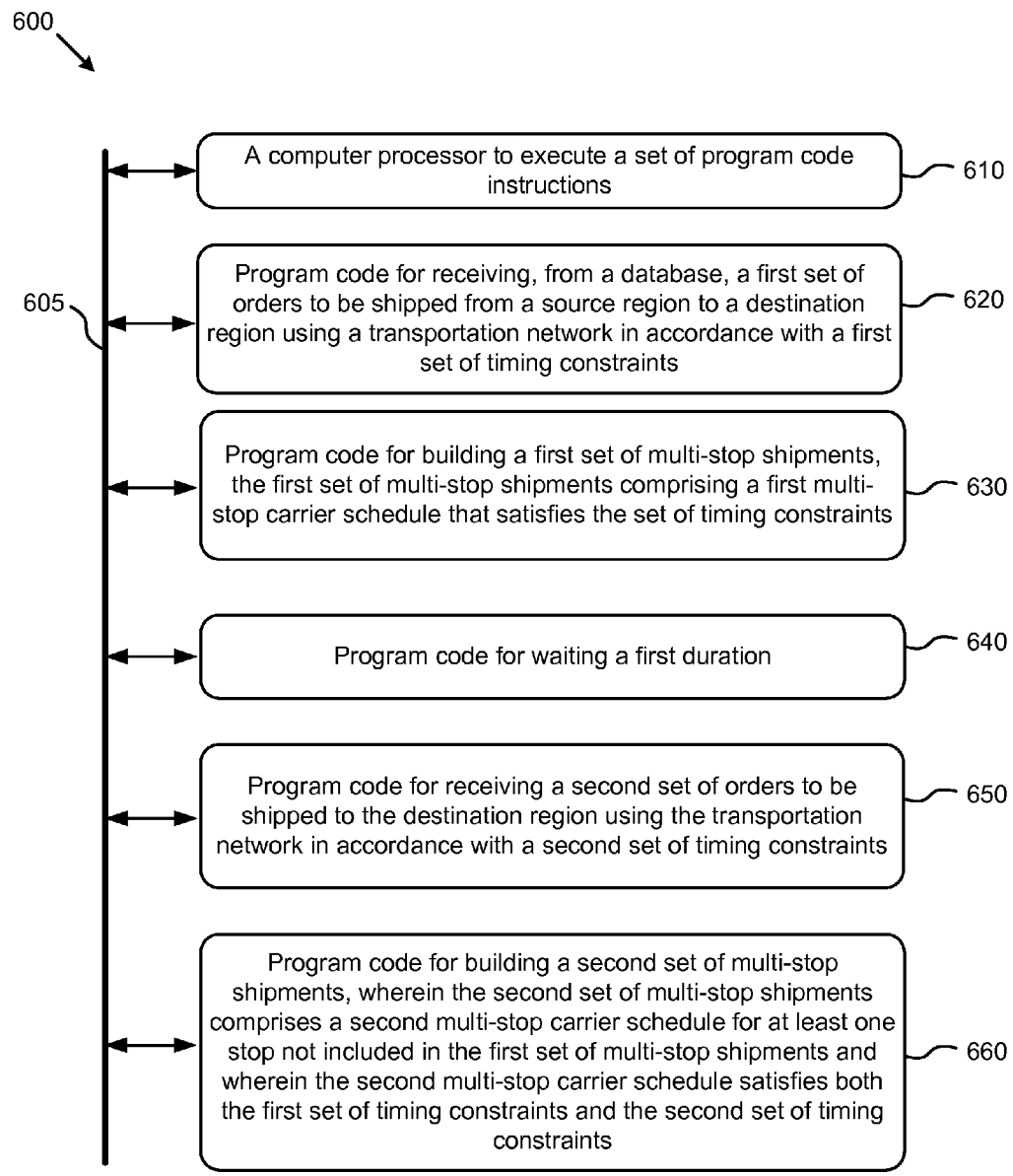
FIG. 6 is a block diagram of a system for achieving cost and latency reductions through dynamic updates of order movement through a transportation network, according to some embodiments.

FIG. 6 is a block diagram of a system for achieving cost and latency reductions through dynamic updates of order movement through a transportation network. As an option, the present system 600 may be implemented in the context of the architecture and functionality of the embodiments described herein. Of course, however, the system 600 or any operation therein may be carried out in any desired environment.

As shown, system 600 comprises at least one processor and at least one memory, the memory serving to store program instructions corresponding to the operations of the system. As shown, an operation can be implemented in whole or in part using program instructions accessible by a module. The modules are connected to a communication path 605, and any operation can communicate with other operations over communication path 605. The modules of the system can, individually or in combination, perform method operations within system 600. Any operations performed within system 600 may be performed in any order unless as may be specified in the claims. The embodiment of FIG. 6 implements a portion of a computer system, shown as system 600, comprising a computer processor to execute a set of program code instructions (see module 610) and modules for accessing memory to hold program code instructions to perform: receiving, from a database, a first set of orders to be shipped from a source region to a destination region using a transportation network in accordance with a first set of timing constraints (see module 620); building a first set of multi-stop shipments, the first set of multi-stop shipments comprising a first multi-stop carrier schedule that satisfies the set of timing constraints (see module 630); waiting a first duration (see module 640); receiving a second set of orders to be shipped to the destination region using the transportation network in accordance with a second set of timing constraints (see module 650); and building a second set of multi-stop shipments, wherein the second set of multi-stop shipments comprises a second multi-stop carrier schedule for at least one stop not included in the first set of multi-stop shipments and wherein the second multi-stop carrier schedule satisfies both the first set of timing constraints and the second set of timing constraints (see module 660).

System Architecture Overview

Figure 7:
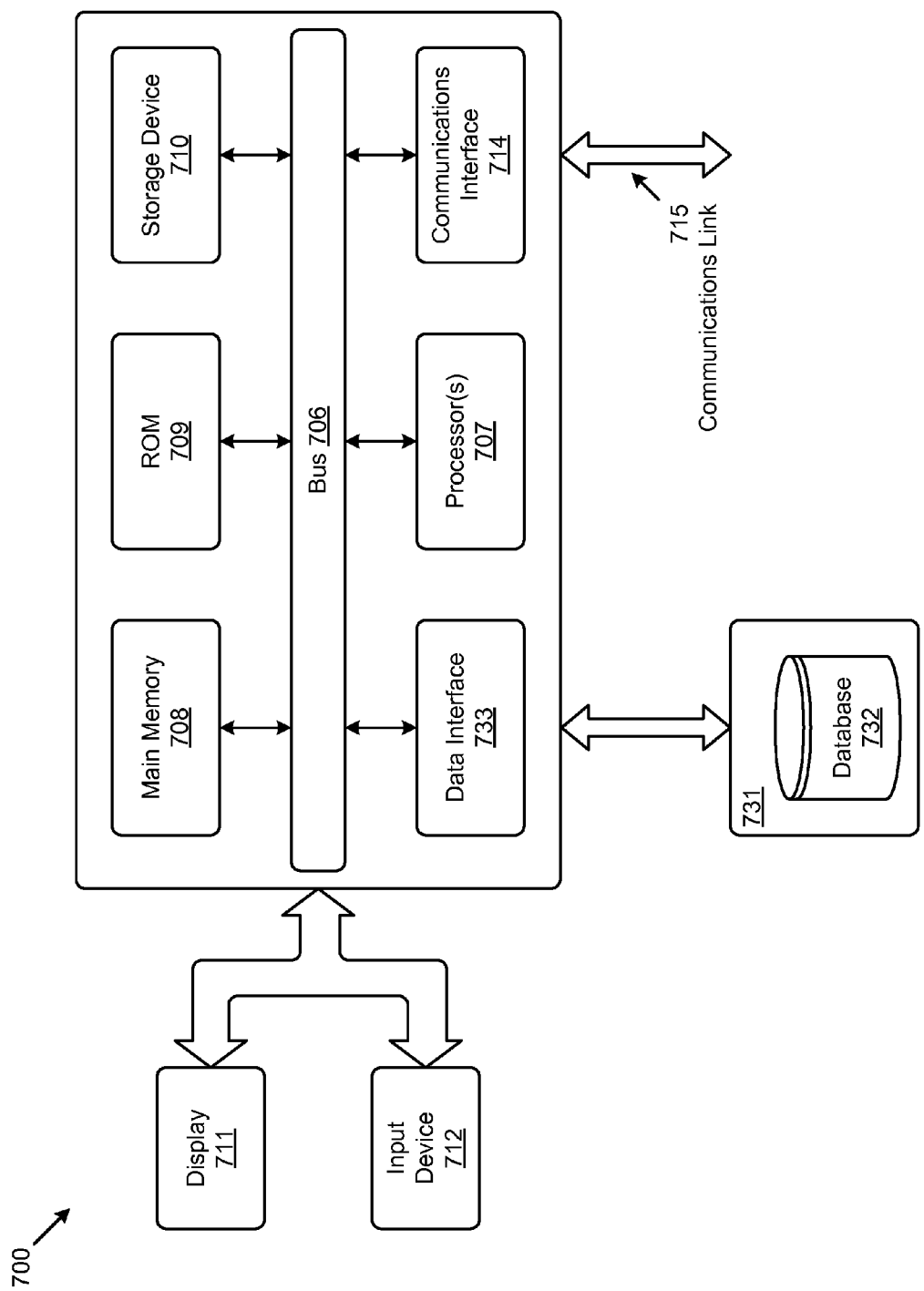
FIG. 7 depicts a block diagram of an instance of a computer system suitable for implementing an embodiment of the present disclosure.

FIG. 7 depicts a block diagram of an instance of a computer system 700 suitable for implementing an embodiment of the present disclosure. Computer system 700 includes a bus 706 or other communication mechanism for communicating information, which interconnects subsystems and devices, such as a processor 707, a system memory 708 (e.g., RAM), a static storage device (e.g., ROM 709), a disk drive 710 (e.g., magnetic or optical), a data interface 733, a communication interface 714 (e.g., modem or Ethernet card), a display 711 (e.g., CRT or LCD), input devices 712 (e.g., keyboard, cursor control), and an external data repository 731.

According to one embodiment of the disclosure, computer system 700 performs specific operations by processor 707 executing one or more sequences of one or more instructions contained in system memory 708. Such instructions may be read into system memory 708 from another computer readable/usable medium, such as a static storage device or a disk drive 710. In alternative embodiments, hard-wired circuitry may be used in place of or in combination with software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to processor 707 for execution. Such a medium may take many forms, including but not limited to, non-volatile media and volatile media. Non-volatile media includes, for example, optical or magnetic disks, such as disk drive 710. Volatile media includes dynamic memory, such as system memory 708.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory medium from which a computer can read data.

In an embodiment of the disclosure, execution of the sequences of instructions to practice the disclosure is performed by a single instance of the computer system 700. According to certain embodiments of the disclosure, two or more computer systems 700 coupled by a communications link 715 (e.g., LAN, PTSN, or wireless network) may perform the sequence of instructions required to practice the disclosure in coordination with one another.

Computer system 700 may transmit and receive messages, data, and instructions, including programs (e.g., application code), through communications link 715 and communication interface 714. Received program code may be executed by processor 707 as it is received, and/or stored in disk drive 710 or other non-volatile storage for later execution. Computer system 700 may communicate through a data interface 733 to a database 732 on an external data repository 731. A module as used herein can be implemented using any mix of any portions of the system memory 708, and any extent of hard-wired circuitry including hard-wired circuitry embodied as a processor 707.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative sense rather than restrictive sense.

What is claimed is:

1. A method comprising:
    using a computing system having at least one processor to perform a process, the process comprising:
        receiving a set of route data;
        converting the set of route data from a first data format to a second data format to generate data suitable for merging with graph items, the second data format comprising a graph of nodes and edges where the nodes represent locations and the edges represent travel between locations, wherein the edges are annotated with edge constraints describing parameters regarding travel between locations;
        receiving a first set of orders to be shipped from a source region to a destination region using a transportation network in accordance with a first set of timing constraints;
        converting the first set of orders into a first set of graph items, the graph items including at least a source node and a destination node, the graph items further comprising timing constraints specifying conditions for using the edges of the graph of nodes, wherein the graph items are to be merged with the graph of nodes and edges as part of building a first set of multi-stop shipments;
        building the first set of multi-stop shipments by merging respective graph items with two or more nodes and one or more edges when the two or more nodes and the one or more edges satisfy respective timing constraints, the first set of multi-stop shipments comprising a first multi-stop carrier schedule that satisfies the first set of timing constraints, the first multi-stop carrier schedule including at least one or more time windows corresponding to times that respective orders are projected to be undergoing movement and specifying times or time ranges for communicating new multi-stop instructions for a portion of the first multi-stop carrier schedule corresponding to the respective orders once the first multi-stop carrier schedule is in progress;
        waiting a first duration;
        determining that at least one time window of the at least one or more time windows of the first multi-stop carrier schedule are open for an already in progress first multi-stop carrier schedule;
        receiving, in response to determining that at least one time window is open, a second set of orders to be shipped to the destination region using the transportation network in accordance with a second set of timing constraints, wherein the at least one time window corresponds to at least one order of the second set of orders and at least one stop of the first multi-stop carrier schedule is completed prior to receiving the second set of orders;
        converting the second set of orders into a second set of graph items, wherein the second set of graph items are to be merged with the graph of nodes and edges as part of building an updated multi-stop carrier schedule; and
        building a second set of multi-stop shipments by merging respective graph items with two or more nodes and one or more edges when the two or more nodes and the one or more edges satisfy respective timing constraints, wherein the second set of multi-stop shipments comprise an updated multi-stop carrier schedule having at least one stop not included in the first multi-stop carrier schedule corresponding to a portion of the first multi-stop carrier schedule having an open time window of the at least one time windows, and wherein the updated multi-stop carrier schedule satisfies both the first set of timing constraints and the second set of timing constraints.

2. The method of claim 1, wherein waiting the first duration comprises waiting for a signal from a carrier.

3. The method of claim 1, wherein the first duration expires before a last stop from among the first set of multi-stop shipments.

4. The method of claim 1, further comprising:
waiting a second duration;
receiving a third set of orders to be shipped to the destination region using the transportation network in accordance with a third set of timing constraints; and
building a third set of multi-stop shipments.

5. The method of claim 4 wherein the second duration expires before a last stop from among the first set of multi-stop shipments.

6. The method of claim 4, wherein the second duration expires before a last stop from among the second set of multi-stop shipments.

7. The method of claim 1, wherein the first set of timing constraints comprise at least one of, a pickup timing constraint, a delivery timing constraint, a crossdock arrival constraint, a crossdock waiting time constraint, and a maximum overland time constraint.

8. The method of claim 1, wherein the first multi-stop carrier schedule comprises a first leg and a second leg.

9. The method of claim 1, wherein the transportation network is a multi-mode transportation network having at least one first overland leg and at least one overseas leg, and at least one second overland leg.

10. The method of claim 9,
further comprising:
waiting a second duration,
receiving a third set of orders to be shipped to the destination region using the transportation network in accordance with a third set of timing constraints, and
building a third set of multi-stop shipments,
wherein:
the first set of timing constraints comprise at least one of, a pickup timing constraint, a delivery timing constraint, a crossdock arrival constraint, a crossdock waiting time constraint, and a maximum overland time constraint,
the first multi-stop carrier schedule comprises at least a first leg and a second leg,
a time window comprises a computed earliest start time, a computed latest start time, a computed earliest finish time, and a computed latest finish time and the time windows are attached to respective order movements,
waiting the first duration comprises waiting for a signal from a carrier and the first duration expires before a last stop from among the first set of multi-stop shipments, and the first duration is calculated based on one or more time windows and a corresponding mode of transportation,
the second set of orders comprising orders received after building the first multi-stop carrier schedule,
the second duration expires before a last stop from among the first set of multi-stop shipments and the second duration expires before a last stop from among the second set of multi-stop shipments, and
the transportation network is a multi-mode transportation network having at least one first overland leg and at least one overseas leg, and at least one second overland leg, and at least one overland leg comprises a network of carriers.

11. A computer program product embodied in a non-transitory computer readable medium, the computer readable medium having stored thereon a sequence of instructions which, when executed by a processor causes the processor to execute a process, the process comprising:
receiving a set of route data;
converting the set of route data from a first data format to a second data format to generate data suitable for merging with graph items, the second data format comprising a graph of nodes and edges where the nodes represent locations and the edges represent travel between locations, wherein the edges are annotated with edge constraints describing parameters regarding travel between locations;
receiving a first set of orders to be shipped from a source region to a destination region using a transportation network in accordance with a first set of timing constraints;
converting the first set of orders into a first set of graph items, the graph items including at least a source node and a destination node, the graph items further comprising timing constraints specifying conditions for using the edges of the graph of nodes, wherein the graph items are to be merged with the graph of nodes and edges as part of building a first set of multi-stop shipments;
building the first set of multi-stop shipments by merging respective graph items with two or more nodes and one or more edges when the two or more nodes and the one or more edges satisfy respective timing constraints, the first set of multi-stop shipments comprising a first multi-stop carrier schedule that satisfies the first set of timing constraints, the first multi-stop carrier schedule including at least one or more time windows corresponding to times that respective orders are projected to be undergoing movement and specifying times or time ranges for communicating new multi-stop instructions for a portion of the first multi-stop carrier schedule corresponding to the respective orders once the first multi-stop carrier schedule is in progress;
waiting a first duration;
determining that at least one time window of the at least one or more time windows of the first multi-stop carrier schedule are open for an already in progress first multi-stop carrier schedule;
receiving, in response to determining that at least one time window is open, a second set of orders to be shipped to the destination region using the transportation network in accordance with a second set of timing constraints, wherein the at least one time window corresponds to at least one order of the second set of orders and at least one stop of the first multi-stop carrier schedule is completed prior to receiving the second set of orders;
converting the second set of orders into a second set of graph items, wherein the second set of graph items are to be merged with the graph of nodes and edges as part of building an updated multi-stop carrier schedule; and building a second set of multi-stop shipments by merging respective graph items with two or more nodes and one or more edges when the two or more nodes and the one or more edges satisfy respective timing constraints, wherein the second set of multi-stop shipments comprise an updated multi-stop carrier schedule having at least one stop not included in the first multi-stop carrier schedule corresponding to a portion of the first multi-stop carrier schedule having an open time window of the at least one time windows, and wherein the updated multi-stop carrier schedule satisfies both the first set of timing constraints and the second set of timing constraints.

12. The computer program product of claim 11, wherein waiting the first duration comprises waiting for a signal from a carrier.

13. The computer program product of claim 11, wherein the first duration expires before a last stop from among the first set of multi-stop shipments.

14. The computer program product of claim 11, the process further comprising:
waiting a second duration;
receiving a third set of orders to be shipped to the destination region using the transportation network in accordance with a third set of timing constraints; and
building a third set of multi-stop shipments.

15. The computer program product of claim 14 wherein the second duration expires before a last stop from among the first set of multi-stop shipments.

16. The computer program product of claim 14, wherein the second duration expires before a last stop from among the second set of multi-stop shipments.

17. The computer program product of claim 11, wherein the first set of timing constraints comprise at least one of, a pickup timing constraint, a delivery timing constraint, a crossdock arrival constraint, a crossdock waiting time constraint, and a maximum overland time constraint.

18. The computer program product of claim 11,
the process further comprising:
waiting a second duration,
receiving a third set of orders to be shipped to the destination region using the transportation network in accordance with a third set of timing constraints, and
building a third set of multi-stop shipments,
wherein:
the first set of timing constraints comprise at least one of, a pickup timing constraint, a delivery timing constraint, a crossdock arrival constraint, a crossdock waiting time constraint, and a maximum overland time constraint,
the first multi-stop carrier schedule comprises at least a first leg and a second leg,
a time window comprises a computed earliest start time, a computed latest start time, a computed earliest finish time, and a computed latest finish time and the time windows are attached to respective order movements,
waiting the first duration comprises waiting for a signal from a carrier and the first duration expires before a last stop from among the first set of multi-stop shipments, and the first duration is calculated based on one or more time windows and a corresponding mode of transportation,
the second set of orders comprising orders received after building the first multi-stop carrier schedule, the second duration expires before a last stop from among the first set of multi-stop shipments and the second duration expires before a last stop from among the second set of multi-stop shipments, and
the transportation network is a multi-mode transportation network having at least one first overland leg and at least one overseas leg, and at least one second overland leg, and at least one overland leg comprises a network of carriers.

19. A computer system comprising:
a memory for storing instructions; and
a processor which performs the following actions when executing instructions:
receiving a set of route data;
converting the set of route data from a first data format to a second data format to generate data suitable for merging with graph items, the second data format comprising a graph of nodes and edges where the nodes represent locations and the edges represent travel between locations, wherein the edges are annotated with edge constraints describing parameters regarding travel between locations;
receiving a first set of orders to be shipped from a source region to a destination region using a transportation network in accordance with a first set of timing constraints;
converting the first set of orders into a first set of graph items, the graph items including at least a source node and a destination node, the graph items further comprising timing constraints specifying conditions for using the edges of the graph of nodes, wherein the graph items are to be merged with the graph of nodes and edges as part of building a first set of multi-stop shipments;
building the first set of multi-stop shipments by merging respective graph items with two or more nodes and one or more edges when the two or more nodes and the one or more edges satisfy respective timing constraints, the first set of multi-stop shipments comprising a first multi-stop carrier schedule that satisfies the first set of timing constraints, the first multi-stop carrier schedule including at least one or more time windows corresponding to times that respective orders are projected to be undergoing movement and specifying times or time ranges for communicating new multi-stop instructions for a portion of the first multi-stop carrier schedule corresponding to the respective orders once the first multi-stop carrier schedule is in progress;
waiting a first duration;
determining that at least one time window of the at least one or more time windows of the first multi-stop carrier schedule are open for an already in progress first multi-stop carrier schedule;
receiving, in response to determining that at least one time window is open, a second set of orders to be shipped to the destination region using the transportation network in accordance with a second set of timing constraints, wherein the at least one time window corresponds to at least one order of the second set of orders and at least one stop of the first multi-stop carrier schedule is completed prior to receiving the second set of orders;
converting the second set of orders into a second set of graph items, wherein the second set of graph items are to be merged with the graph of nodes and edges as part of building an updated multi-stop carrier schedule; and building a second set of multi-stop shipments by merging respective graph items with two or more nodes and one or more edges when the two or more nodes and the one or more edges satisfy respective timing constraints, wherein the second set of multi-stop shipments comprise an updated multi-stop carrier schedule having at least one stop not included in the first multi-stop carrier schedule corresponding to a portion of the first multi-stop carrier schedule having an open time window of the at least one time windows, and wherein the updated multi-stop carrier schedule satisfies both the first set of timing constraints and the second set of timing constraints.

20. The computer system of claim 19, the actions further comprising:

waiting a second duration, receiving a third set of orders to be shipped to the destination region using the transportation network in accordance with a third set of timing constraints, and building a third set of multi-stop shipments, wherein:

the first set of timing constraints comprise at least one of, a pickup timing constraint, a delivery timing constraint, a crossdock arrival constraint, a crossdock waiting time constraint, and a maximum overland time constraint, the first multi-stop carrier schedule comprises at least a first leg and a second leg, a time window comprises a computed earliest start time, a computed latest start time, a computed earliest finish time, and a computed latest finish time and the time windows are attached to respective order movements, waiting the first duration comprises waiting for a signal from a carrier and the first duration expires before a last stop from among the first set of multi-stop shipments, and the first duration is calculated based on one or more time windows and a corresponding mode of transportation, the second set of orders comprising orders received after building the first multi-stop carrier schedule, the second duration expires before a last stop from among the first set of multi-stop shipments and the second duration expires before a last stop from among the second set of multi-stop shipments, and the transportation network is a multi-mode transportation network having at least one first overland leg and at least one overseas leg, and at least one second overland leg, and at least one overland leg comprises a network of carriers.

* * * * *

UNITED STATES PATENT AND TRADEMARK OFFICE
CERTIFICATE OF CORRECTION

PATENT NO. : 9,990,602 B2
APPLICATION NO. : 14/107761
DATED : June 5, 2018
INVENTOR(S) : Arunapuram Page 1 of 1

It is certified that error appears in the above-identified patent and that said Letters Patent is hereby corrected as shown below:

On the Title Page

Item [74], delete "Vita" and insert -- Vista --, therefor.

In the Specification

Column 5, Line 5, delete "And" and insert -- and --, therefor.

Signed and Sealed this
Fifth Day of February, 2019

Andrei Iancu
*Director of the United States Patent and Trademark Office*